United States Patent [19]

Lisec

[11] Patent Number: 4,495,023

[45] Date of Patent: Jan. 22, 1985

[54] APPARATUS FOR FITTING SPACER FRAMES

[76] Inventor: Peter Lisec, Bahnhofstrasse 34, Amstetten-Hausmening, Austria

[21] Appl. No.: 445,831

[22] Filed: Nov. 30, 1982

[30] Foreign Application Priority Data

Dec. 3, 1981 [AT] Austria ................................ 5194/81
Apr. 5, 1982 [AT] Austria ................................ 1355/82

[51] Int. Cl.³ ........................ B32B 31/00; B23P 19/00

[52] U.S. Cl. .................................. 156/562; 29/281.1; 29/468; 29/721; 29/822; 29/DIG. 1; 156/109; 156/292; 269/320

[58] Field of Search ................. 156/99, 104, 106, 107, 156/109, 292, 556, 299, 363, 562; 29/281.1, 281.3, 281.4, 281.5, 464, 468, 714, 721, 822, DIG. 1; 269/43, 316, 317, 320

[56] References Cited

U.S. PATENT DOCUMENTS

| | | | |
|---|---|---|---|
| 2,336,544 | 12/1943 | Hopfield | 156/106 X |
| 3,227,593 | 1/1966 | Woelk | 156/104 |
| 3,592,093 | 7/1971 | Cantelli | 269/320 X |
| 3,827,683 | 8/1974 | Seborg et al. | 269/43 X |
| 3,835,683 | 9/1974 | Bradick | 269/320 X |
| 3,851,684 | 12/1974 | Wyrick | 29/462 X |
| 3,876,196 | 4/1975 | Naggert | 269/320 X |
| 4,356,614 | 11/1982 | Käuferle et al. | 156/109 X |

FOREIGN PATENT DOCUMENTS

| | | | |
|---|---|---|---|
| 2153150 | 5/1973 | Fed. Rep. of Germany | 156/99 |
| 2309419 | 9/1974 | Fed. Rep. of Germany . | |
| 2707031 | 4/1978 | Fed. Rep. of Germany . | |
| 2749035 | 5/1978 | Fed. Rep. of Germany | 29/281.1 |
| 2712651 | 11/1978 | Fed. Rep. of Germany . | |
| 2816437 | 8/1979 | Fed. Rep. of Germany | 156/99 |
| 26667 | 2/1977 | Japan | 29/822 |
| 1454685 | 11/1976 | United Kingdom . | |

*Primary Examiner*—Charlie T. Moon
*Assistant Examiner*—Ronald S. Wallace
*Attorney, Agent, or Firm*—Young & Thompson

[57] ABSTRACT

An apparatus for fitting spacer frames to panes of glass in the manufacture of insulating glass has a support wall and a frame which is movable towards and away from the support wall and the upper horizontal limb of which can be moved upwardly and downwardly for the purpose of adaptation to the height of a spacer frame, while retractible pins, clamp means and pressure pins for the spacer frame are provided on the frame of the apparatus.

14 Claims, 10 Drawing Figures

APPARATUS FOR FITTING SPACER FRAMES

The invention relates to an apparatus for fitting spacer frames to panes of glass in the course of manufacture of insulating glass panes, comprising a substantially perpendicular support wall and a conveyor means for conveying panes of glass into the apparatus.

As the operation of fitting spacer frames by hand, in the manufacture of double-glazed or multiple-glazed insulating glass assemblies, requires particular attentiveness on the part of the worker, as the frame must be fitted in a position of being precisely aligned with respect to the panes of glass, apparatuses of the general kind set forth above have already been proposed. The known apparatus still suffer from problems in regard to the manner and method of holding and inserting the spacer frame, in or before the operation of fitting the frame to the panes of glass.

In the known apparatuses of the kind set forth above, the operation of inserting the spacer frames is difficult for the reason that the spacer frames, which have little torsional strength, must be threaded in between the pane of glass and the part of the machine for holding the spacer frames. A further disadvantage of a known apparatus of this design is that it is not possible for the fourth limb of the spacer frame also to be precisely positioned. Finally, the known apparatus also suffers from the disadvantage that the spacer frames are only held from the inside so that on the one hand the corner connections are extremely heavily loaded so that it is only possible reliably to use welded or soldered frames, and on the other hand outwardly curved frame limbs cannot be disposed in an aligned position as there are no holder members which engage the limbs of the frame from the outside. This last problem does not occur in another known apparatus of the general kind set forth above, as the apparatus has clip members which engage the limbs of the frame from both sides. This apparatus also solves the problem of the troublesome operation of threading the spacer frames between the pane of glass and the frame holding means, because the holding means for the frame can be pivoted to such an extent that the frame can readily be inserted. It will be appreciated however that such pivotal movement requires a considerable amount of space, as panes which are up to five and more meters in dimension in one direction must be taken into account.

The invention is based on the problem of providing an apparatus of the above-indicated general kind, which is reliable in operation and in regard to which the spacer frames simply have to be inserted into the apparatus by hand or by a suitable feed means, whereupon the operation of fitting the spacer frame, with the individual limbs of the frame in a position of precise alignment relative to the edges of the panes of glass, is carried out automatically.

According to the invention, this is achieved in that there is provided a frame which is arranged in front of the support wall and which is movable towards and away from the support wall, that the upper horizontal limb of the frame is guided for example on the vertical limbs of the frame in such a way that it is displaceable upwardly and downwardly, that clamp means for a spacer frame are provided on the upper and lower horizontal limbs and on at least one of the vertical limbs of the frame, and that retractible support pins are mounted on the vertical limb at the entry end and/or at the exit end, and on the horizontal limbs of the frame.

In the apparatus according to the invention, the spacer frame is inserted from the front into the movable frame of the apparatus, the spacer frame thus bearing against the support pins which are in an advanced position and which prevent the spacer frame from dropping on to the pane of glass to which it is to be fitted. Only after the limbs of the spacer frame have been gripped by the clamp means provided on the frame of the apparatus are the support pins retracted and the frame of the apparatus is moved towards and applied to the support wall or the pane of glass disposed thereat. The clamp means on the frame of the apparatus ensure that the limbs of the spacer frame are precisely aligned and are fitted without bending or distorting the spacer frame.

For the purposes of aligning the fourth limb of the frame, the invention may also provide that the clamp means which are arranged on the vertical limb of the frame, at the entry end, being the front limb as viewed in the direction of conveying movement, can be moved towards and retracted from the support wall, relative to the limb of the frame. In this embodiment of the apparatus according to the invention, for pressing into place the fourth limb of the spacer frame, which is the rear limb as viewed in the direction of conveying movement, the pane of glass with spacer frame fitted thereto is moved back into the region of the perpendicular limb of the frame of the apparatus, which is the front limb, that is to say, at the entry end, whereupon the clamp means disposed on that limb of the frame align the limb of the spacer frame. Thereupon, that limb of the spacer frame is also pressed against the pane of glass by the pressure pins.

Another embodiment of the invention can provide that there is a substantially vertically extending beam member, which is reciprocal in the direction of conveying movement, with clamp members being provided on the beam member for aligning the fourth limb of the spacer frame, that is to say, the rear limb as viewed in the direction of conveying movement, while the clamp members are movable towards the support wall relative to the beam member synchronously with the frame. This embodiment also permits the limb of the spacer frame, which is the rear limb as viewed in the direction of oonveying movement, to be pressed into position in a condition of proper adjustment, although there is no need for the pane of glass to be moved back in this embodiment. The displaceable beam member is moved into the region of the edge of the pane of glass which is the rearward edge in the direction of conveying movement, whereupon the clamp members provided thereon grip the limb of the spacer frame and the spacer frame which is thus held at all four limbs is fitted to the pane of glass by forward movement of the frame and the clamp means on the beam member.

An embodiment of the apparatus according to the invention, which enjoys enhanced efficiency due to an advantageous mode of operation, is distinguished in that the retractible support pins for the spacer frame are provided on the upper and lower horizontal limbs and on the vertical limb, which is arranged at the entry end, of the frame, that the clamp means on the upper, lower and entry-end vertical limbs are jointly actuable, and that the clamp means arranged at the exit-end vertical limb of the frame are actuable independently of the clamp means on the other limbs of the frame.

This embodiment of the apparatus according to the invention permits all four limbs of a spacer frame to be fitted to a pane of glass in a precisely aligned condition, in an apparatus of an extremely simple design. With the apparatus according to the invention, in a first stage of operation, the upper and lower horizontal limbs of the spacer frame and the spacer frame limb which is at the rear in the direction of conveying movement can be gripped by the clamp means of the apparatus according to the invention, and fitted to the pane of glass in a position of precise alignment. Thereupon, the pane of glass can be moved on until the fourth vertical limb of the spacer frame, that is to say, the front limb as viewed in the directior of conveying movement, is aligned relative to the clamping and pressing means arranged on the vertical limb of the frame of the apparatus, which is at the exit end. The clamp means then engage the abovementioned fourth limb of the spacer frame, and aligns it, whereupon it is pressed against the pane of glass by the pressing means.

In this manner, all four limbs of a spacer frame can be fitted to a pane of glass in a condition of precise alignment and pressed against the pane, without the pane of glass also having to be moved in the opposite direction to the main direction of conveying movement, or without the necessity for carrier members for clamping and pressing means, such carrier members being aligned vertically in the apparatus and being displaceable in a plane which is parallel to the plane of conveying movement of the panes of glass.

In addition, the invention may provide that the half of the conveyor means for the panes of glass, which half is adjacent to the exit-end vertical limb of the frame, is actuable independently of the half of the conveyor means which is arranged at the entry end. In this embodiment, two panes of glass may be handled at the same time, if the horizontal dimension thereof is no greater than half the length of the apparatus. In this apparatus, the part of the spacer frame which includes the upper, lower and rearward vertical limbs of the frame are pressed into place against a pane of glass in the entry-end section of the apparatus, while the front vertical limb of a spacer frame is simultaneously pressed against another pane of glass, in the exit-end section of the apparatus.

A particularly simple and operationally reliable embodiment of the apparatus according to the invention provides that the clamp means arranged on the limbs of the frame have clamp jaws which are for example of an angular configuration and which are pivotal into their operative position about axes which are parallel to the limbs of the frame.

In the apparatus according to the invention, in the intermediate conveying movement in respect of a pane of glass against which a spacer frame has been pressed, at three sides thereof, the frame of the apparatus may remain in its position in which it is advanced towards the pane of glass. In order to ensure that, in an intermediate conveying movement, with the frame in the advanced position, the pane of glass and/or the spacer frame fitted thereto does not rub or strike against parts of the apparatus, the invention may provide that the lower horizontal limb of the frame can be lowered slightly during conveying movement of a pane of glass with spacer frame fitted thereto.

An embodiment may provide that pressure pins which can be moved forward and retracted are provided on the frame, for pressing the spacer frame against the pane of glass. In this connection, it has been found desirable for the pressure pins to be provided at their front end with a tip or point, the tips or points engaging the spacer frame outside of the layer of adhesive or sealant applied to the spacer frame.

A desirable embodiment of the present invention is one in which the clamp means on the frame comprise an abutment which is fixed with respect to the frame, and a clamp plate which is displaceable and rotatable from a rest position into its operative position of pressing the spacer frame against the abutment. In practice, the clamp means are such that the clamp plate is arranged eccentrically relative to the shaft carrying it, and, after the forward movement and pivotal movement through 90°, can be retracted towards the abutment. This embodiment is particularly interesting because it also automatically provides for aligning the spacer frame in a horizontal direction, as the clamp plates draw the frame against the abutments which are fixed with respect to the frame.

Another embodiment in accordance with the invention provides that loop bracket members are provided on the lower limb of the frame, comprising for example spring wire and preventing a spacer frame from striking against the actuating cylinders for the pressure pins.

In order to prevent the support pins from rubbing against the layers of adhesive or sealant (butyl rubber) applied to the spacer frame, when the pins are retracted from their operative position, it may be provided that the front surface of the abutment pins, which is towards the spacer frame, is of a curved configuration. That then gives contact which is then only linear. In accordance with the invention, for the same purpose, it may be provided that the front surface of the support pins, which is towards the spacer frame, extends at an inclined angle with respect to the line of movement thereof.

If, as proposed in accordance with the invention, the support pins can be moved back and forth by means of crankshafts then it is possible for the support pins to be lifted away from the spacer frame or the layer of adhesive or sealant applied thereto, at the beginning of the retraction movement of the support pins into their rest position.

Further details and features of the invention will be apparent from the following description of the embodiments diagrammatically illustrated in the drawings, in which.

Figure 4:
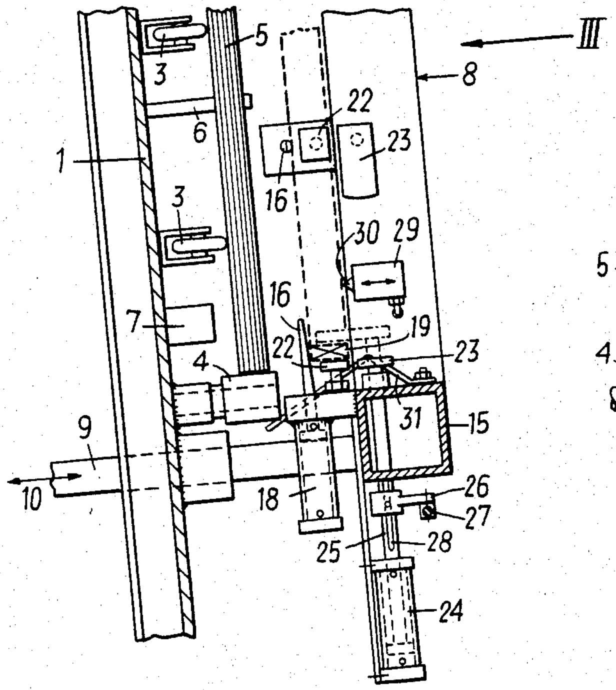
Figure 5:
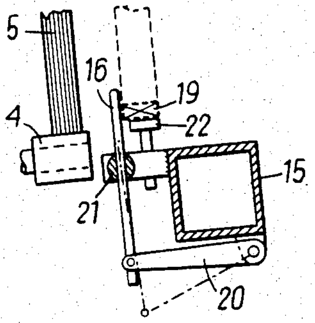
Figure 6:
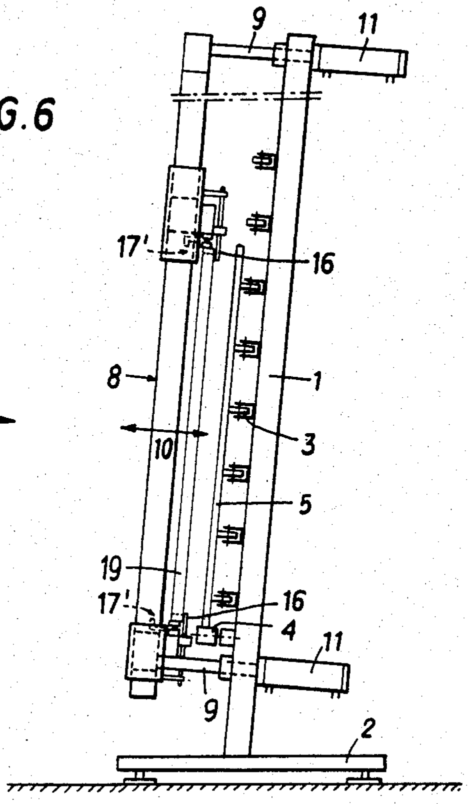
Figure 7:
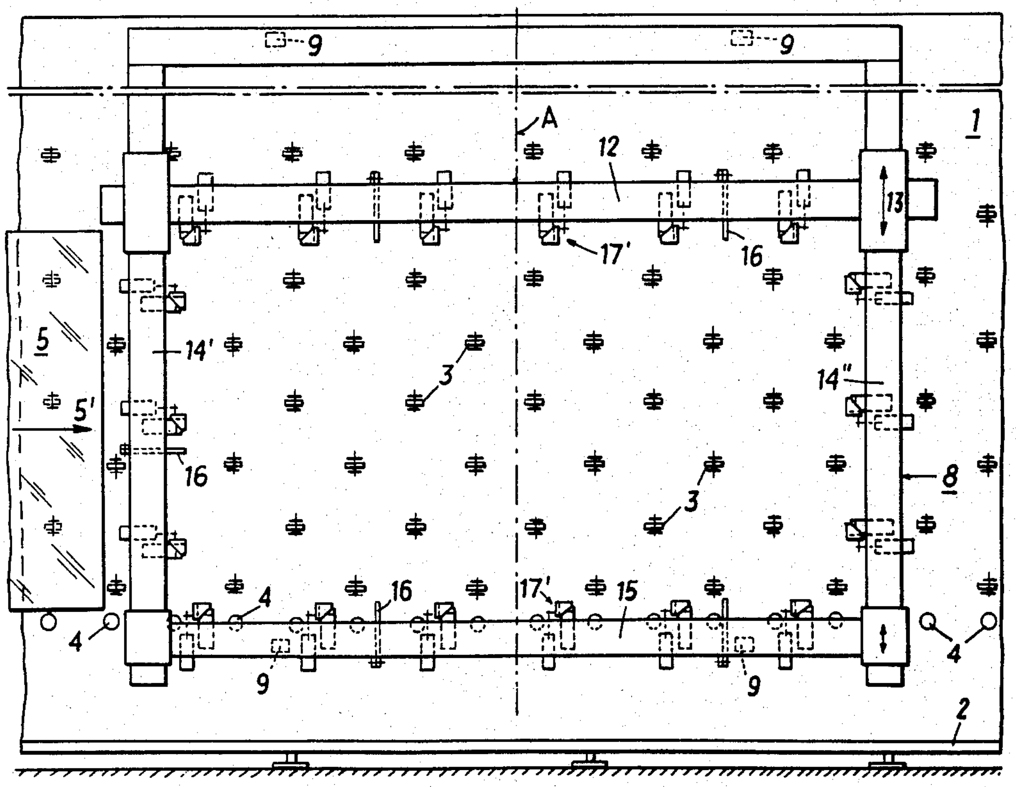
Figure 8:
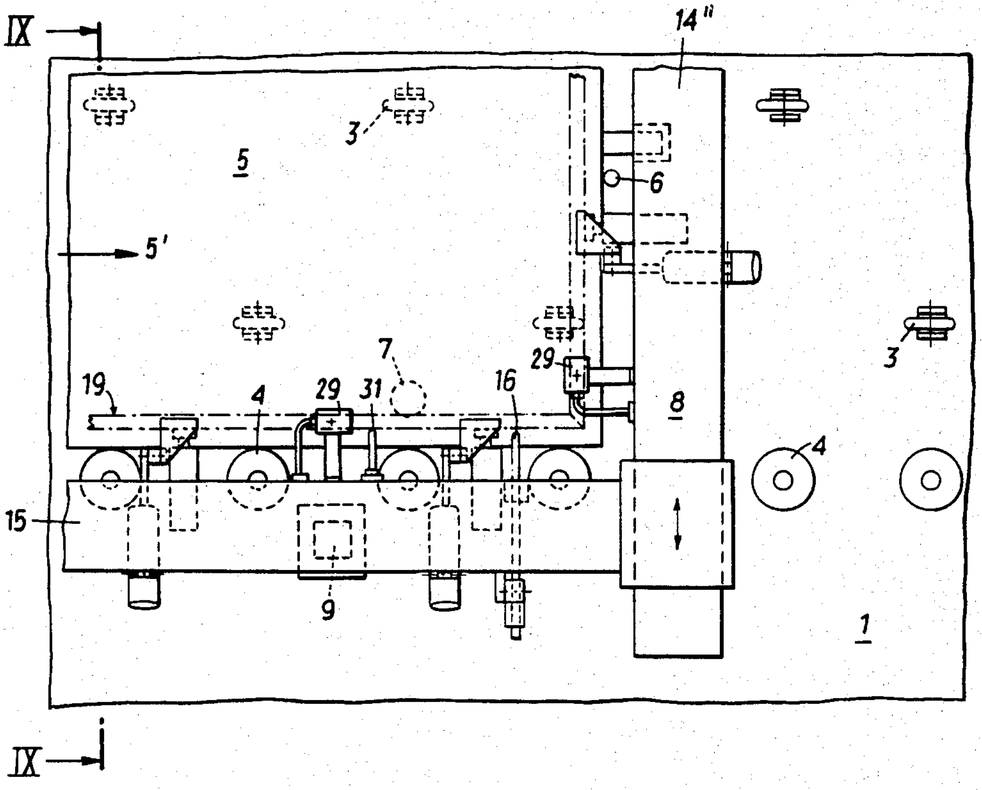
Figure 9:
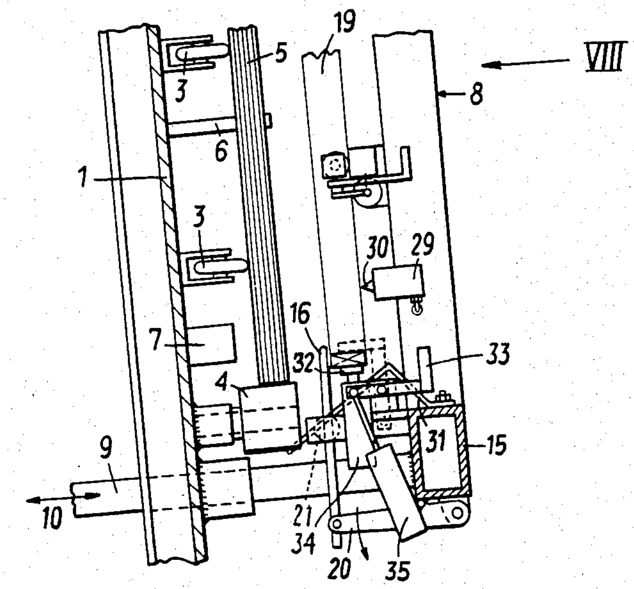
Figure 10:
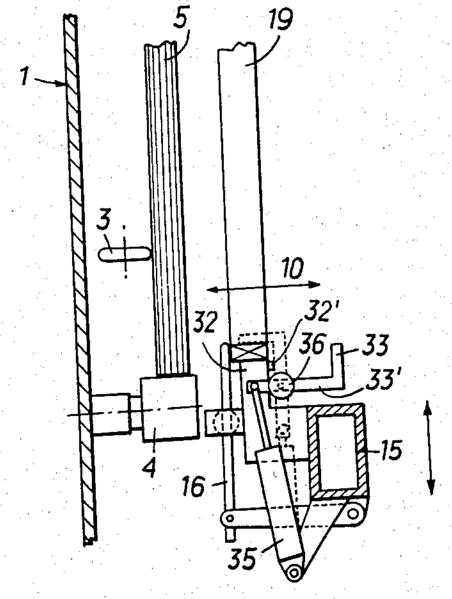

FIG. 4 shows a view on an enlarged scale of an embodiment of the clamp means, FIG. 5 shows another embodiment of the support pins, FIG. 6 shows a diagrammatic side view of another embodiment of the apparatus, FIG. 7 shows the apparatus in front view (arrow VII in FIG. 6), FIG. 8 shows a view on an enlarged scale of tne lower corner of the frame at the exit end (arrow VIII in FIG. 9), FIG. 9 shows a view in section taken along line IX—IX in FIG. 8, and FIG. 10 is a view in cross-section similar to that shown in FIG. 9, of another embodiment.

Figure 1:
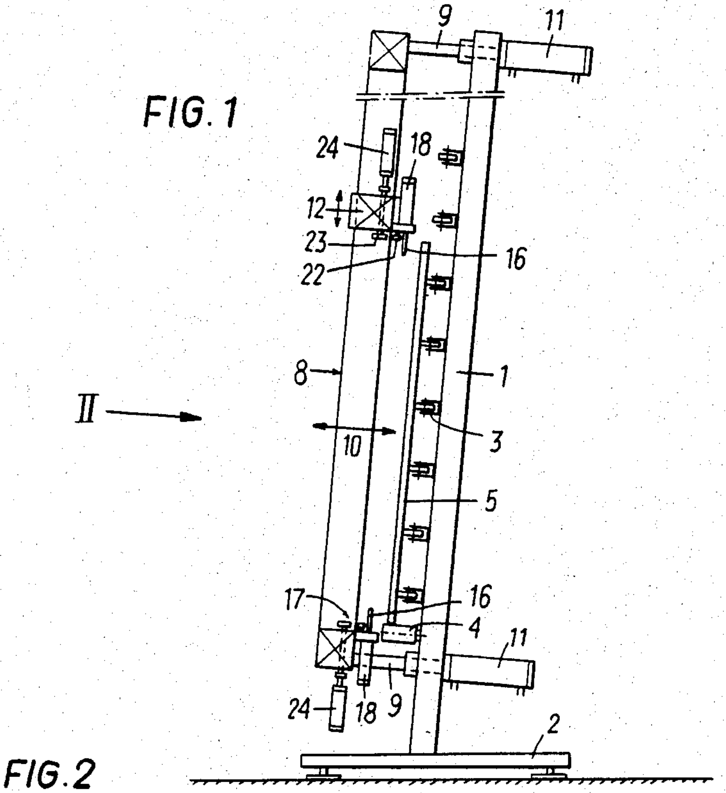
FIG. 1 shows a side view of an apparatus for fitting spacer frames.
Figure 2:
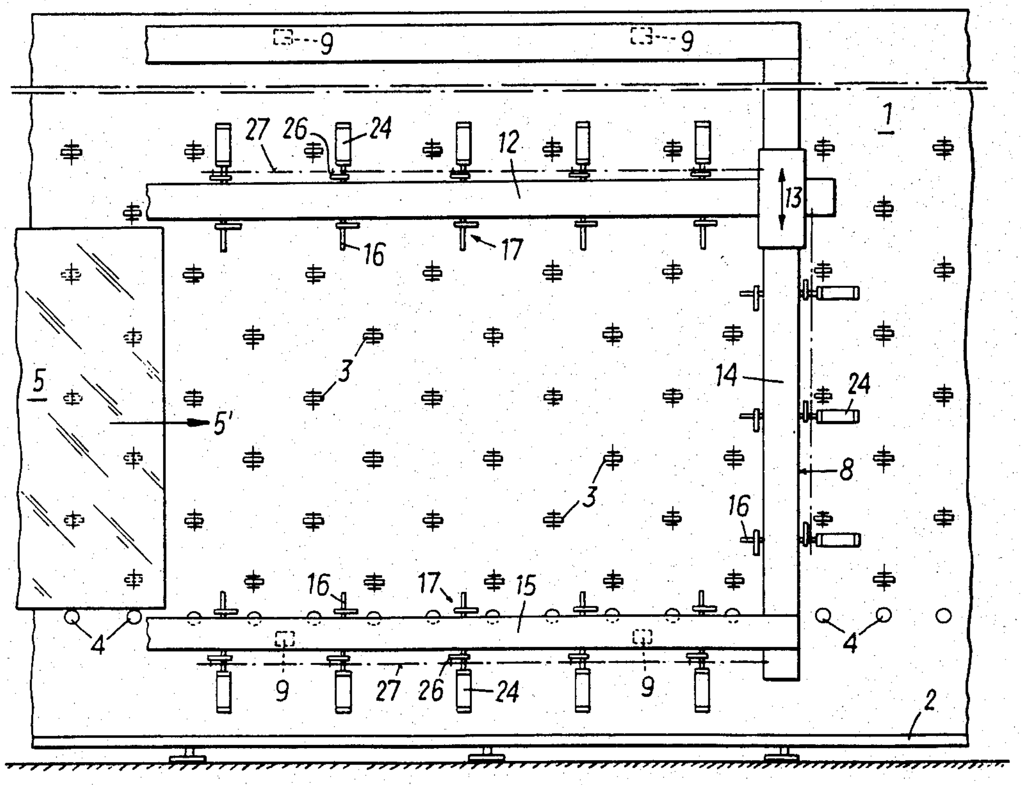
FIG. 2 shows a view of the apparatus from the front.
Figure 3:
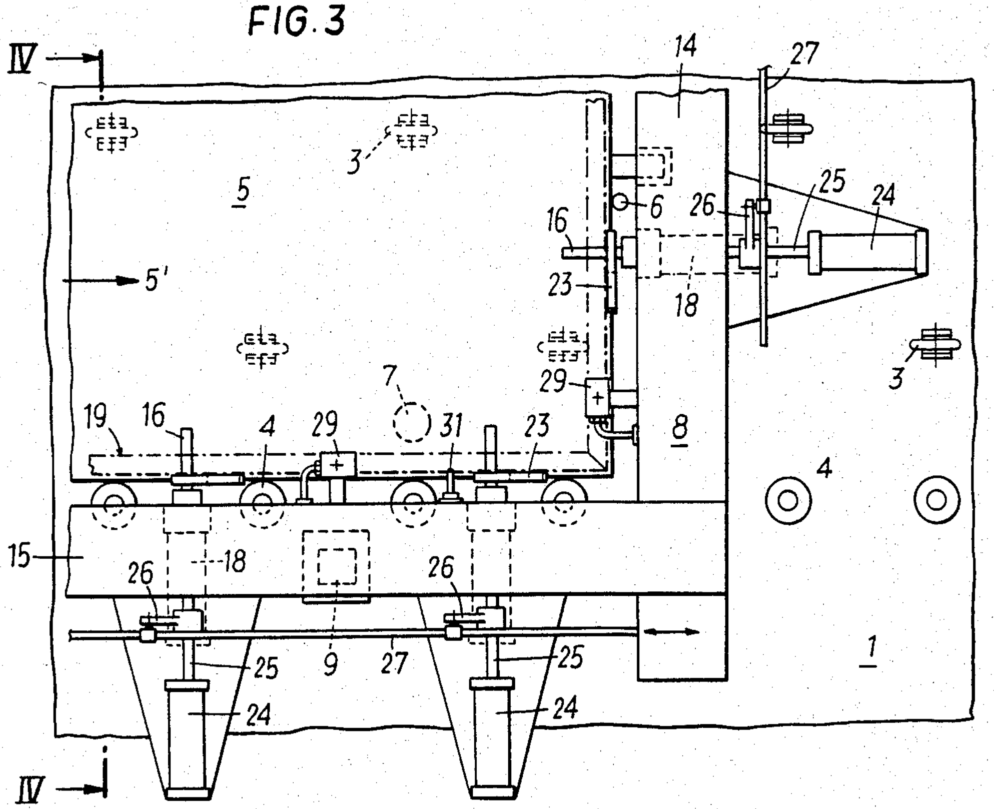
FIG. 3 shows a detail on an enlarged scale.

As shown in particular in FIG. 1, the apparatus according to the invention comprises a support wall 1 which stands on the floor by means of feet 2. The support wall 1 is inclined rearwardly relative to the horizontal at a small angle, for example about 5°, while on its front side it has a plurality of support rollers 3 which are freely rotatable about vertical axes. Provided at the lower edge of the support wall 1 are conveyor rollers 4 which are rotatable about substantially horizontal axes and which in combination form the conveyor means for conveying panes of glass 5, in the direction of the arrow 5' in FIG. 2. Provided in the region of the exit end of the support wall 1 is an end abutment 6 (see FIG. 3) which is movable into and out of its operative position. As shown in FIG. 3, arranged at a spacing in front of abutment 6 is a switch 7 which is operated without operative contact and which reduces the speed of conveying movement of the pane of glass 5 so that the pane of glass 5 does not encounter the end abutment 6 with unreduced impetus.

Disposed at a spacing in front of the support wall 1 is a frame 8 which is arranged parallel to the support wall 1 and which is mounted to the support wall 1 by way of guide rods 9 and is displaceable relative to the support wall 1, in the direction indicated by the double-headed arrow 10. As illustrated in the specific embodiment, pressure fluid cylinders 11 may be provided for displacing the frame 8 relative to the support wall 1. It is also possible however for transmission means comprising toothed racks and gears to be provided for moving the frame 8 relative to the support wall 1, with the transmissions preferably being coupled together.

The upper horizontal limb 12 of the frame 8 is guided so as to be movable upwardly and downwardly in the directions indicated by the double-headed arrow 13, on the vertical limbs 14, by drive means which are not shown herein. Displaceability of the limb 12 serves to adapt the height of the frame 8 to the dimensions of the spacer frame to be fitted.

Support pins 16 and clamp means 17 are provided both on the perpendicular limb 14 at the exit end, and also on the two horizontal limbs 12 and 15, of the frame 8. Pressure fluid cylinders 18 are provided for actuating the support pins 16. So that the support pins 16 do not rub against the spacer frame 19 or a layer of adhesive or sealant applied thereto, in the retraction movement of the pins 16, the side of the pins which is towards the spacer frame 19 is curved and is at an inclined angle relative to the line of movement of the support pins 16.

In the embodiment of the support pins 16, as shown in FIG. 5, the arrangement has a crank drive 20 to which the support pins 16 are coupled. When the crank drive is pivoted, the support pins 16 are retracted and at the same time perform a tilting movement about their mountings 21 so that they begin to pivot away from the spacer frame 19 at the beginning of their retraction movement.

The clamp means 17 comprise an abutment 22 which is fixed with respect to the frame, and a movable clamp plate 23. The abutments 22 which are fixed with respect to the frame are so arranged that a spacer frame 19 which bears against the abutments, as shown in FIG. 3, is properly aligned relative to a pane of glass 5 which is in the limit position on the support wall 1.

The movable clamp plates 23 can be moved forward into the space delimited by the frame 8, by means of pressure fluid cylinders 24. In addition, the clamp plates 23 may be pivoted, by means of link members 26 carried on the shafts 25 of the clamp plates 23, by actuation of a connecting rod 27, in such a way that the clamp plates 23 each lie opposite a respective abutment 22. The link members 26 are carried slidably on the shafts 25 and each have a projection which engages into a groove 28 in the shaft 25 so that they are nonrotatably coupled to the shafts 25. After the clamp plates 23 have been pivoted into the position shown in broken line in FIG. 4, they may be retracted towards the abutment 22 by actuation of the pressure fluid cylinder 24, thus firmly clamping the spacer frame between themselves and the fixed abutment 22.

Disposed between each two clamp means are pressure pins 30 which can be advanced by pressure fluid cylinders 29, the pressure pins 30 being so arranged that they engage the spacer frame 19 beside the layers of adhesive or sealant, which are applied thereto by spraying.

The mode of operation of the above-described apparatus is as follows:

A pane of glass 5 is moved along the support wall, standing on the conveyor rollers 4 and lying against the support rollers 3, into the limit position defined by the end abutment 6 (see FIG. 3). At the same time, the movable horizontal beam member 12 of the frame 8 is displaced until the fixed abutments 22 provided thereon are suitably aligned with respect to the upper horizontal edge of the glass.

Thereupon, a spacer frame 19 coated for example with sealant or adhesive (butyl rubber) is fitted into the frame 8, standing on the abutments 22 disposed on the lower limb 15 and bearing against the support pins 16. So that, when the spacer frame 19 is inserted, there is no danger of the spacer frame striking against the clamp plates 23 or the pressure fluid cylinders 29 for the pressure pins 30, which cylinders are disposed on the lower horizontal limb 15 of the frame 8. Suitably bent or curved loop bracket members 31 are provided on the lower horizontal limb 15.

Triggered by a follow-up or sequential control, the clamp plates 23 are now advanced, and turned through 90° so that they are disposed substantially transversely with respect to the limbs of the frame 8 which carry them, and are then retracted towards the fixed abutments 22. When that is done, the limbs of the spacer frame 19 are aligned relative to the pane of glass 5 in the desired manner; that is also particularly important in regard to the vertical and the upper horizontal limbs of the spacer frame 19. As soon as the spacer frame 19 is held by the clamp means 17, the support pins 16 are retracted and the frame 8 with the spacer frame 19 held thereto is advanced towards the pane of glass 5.

At the same time as the clamp means 17 are released, the pressure pins 30 are actuated and press the spacer frame 19 against the pane of glass 5, in a precisely aligned position.

The frame 8 is then retracted again, the end abutment 6 is pivoted or retracted into its rest position, and the pane of glass 5 with spacer frame 19 fitted thereto is conveyed out of the apparatus.

After the support pins 16 have been moved forward and the clamp plates 23 of the clamp means 17 have been retracted, the apparatus is again in a condition of readiness for fitting a further spacer frame.

The apparatus shown in FIGS. 6 to 10 also comprises a support wall 1 which stands on the floor by means of feet 2. The support wall 1 is inclined rearwardly relative to the vertical by a small angle, for example about 5°, and on its front carries a plurality of support rollers 3 which are freely rotatable about vertical axes. Provided at the lower edge of the support wall 1 are conveyor rollers 4 which are rotatable about substantially horizontal axes and which in combination form the conveyor means for conveying panes of glass 5 in the direction indicated by the arrow 5' (see FIG. 7).

Once again, disposed at a spacing in front of the support wall 1 is a frame 8 which is disposed parallel to the support wall 1 and which is mounted to the support wall 1 by way of guide rods 9 and is displaceable relative thereto in the direction indicated by the double-headed arrow 10.

The upper horizontal limb 12 of the frame 8 is guided on the perpendicular limbs 14' and 14" in such a way as to be movable upwardly and downwardly in the direction indicated by the double-headed arrow 13 (see FIG. 7). The displaceability of the limb 12 serves to adapt the height of the frame 8 to the dimensions of the spacer frame to be fitted.

In the embodiment shown in FIGS. 6 to 10, retractible support pins 16 are provided both on the perpendicular limb 14' at the entry end of the frame 8, and also on the two horizontal limbs 12 and 15 of the frame 8. A crank drive 20 to which the support pins 16 are coupled is provided for actuating the support pins 16. When the crank drive 20 is pivoted (see the arrow in FIG. 9), the support pins 16 are retracted and at the same time perform a tilting movement about their mountings 21, so that they pivot away from the spacer frame 19 at the beginning of the retraction movement.

All four limbs 12, 14', 14" and 15 of the frame, in the embodiment shown in FIGS. 6 to 10, carry clamp means 17' comprising clamp strut or post members 32 which can be moved forward and back (see FIG. 9) or which are fixed with respect to the frame (see FIG. 10), and pivotal angle clamping members 33. Pneumatic cylinders 34 for example are provided for actuating the clamping members 32, and pressure fluid cylinders 35 are provided for actuating the angle clamping members 33. In the clamping position of the angle clamping members 33, as shown in broken line in FIG. 9, the limbs of the spacer frame 19 which are clamped between the angle clamping members 33 and the clamp members 32 are adjusted and precisely aligned relative to the pane of glass 5 which leans against the support wall 1.

Pressure pins 30 which can be moved forward by pressure fluid cylinders 29 are provided between each two clamp means 17', the pressure pins 30 being so arranged that they engage the spacer frame 19, beside the layers of adhesive or sealant applied to the spacer frame.

The mode of operation of the above-described apparatus is as follows:

A pane of glass 5 is conveyed along the support wall 1, standing on the conveyor rollers 4 and bearing against the support rollers 3, into the apparatus until the vertical edge which is the trailing edge with respect to the direction of conveying movement (arrow 5') is properly aligned relative to the clamp means 17' arranged at the vertical limb 14' at the entry end of the frame 8. For that purpose, the apparatus includes switches (not shown), while in particular a light barrier assembly may be provided for detecting the trailing vertical edge of the pane of glass 5. As soon as the pane of glass 5 is in its limit position, the upper horizontal limb 12 of the frame 8 is lowered until the clamp means 17' provided thereon are properly aligned with respect to the upper horizontal edge of the pane of glass 5 (see FIG. 1). Thereupon, a spacer frame 19 which is coated with sealant or adhesive (butyl rubber) is introduced into the frame 8, standing on the clamp strut members 32 arranged on the lower limb 15 of the frame and bearing against the support pins 16.

Thereupon, for actuating the pressure fluid cylinders 35, the angle clamp members 33 are pivoted into their clamping position so that the upper and lower horizontal limbs of the spacer frame 19 and the trailing vertical limb of the spacer frame 19 is held fast in a properly aligned position by the clamp means 17' disposed on the limbs 12, 14' and 15. When the spacer frame 19 is held fast in that manner, it is precisely aligned relative to the pane of glass 5, as soon as it is held fast by the clamp means 17'. As soon as the spacer frame 19 is held by the clamp means 17', the support pins 16 are retracted and the frame 8 with the spacer frame 19 mounted thereon is advanced towards the pane of glass 5 on the support wall 1. At the end of the forward movement, the pressure pins 30 are actuated and press the spacer frame 19 against the pane of glass 5, in a precisely aligned position.

Thereupon the clamp means 17' are opened again and the pane of glass 5 with the spacer frame 19 pressed thereagainst on three sides is moved on by the conveyor rollers 4 until the vertical limb of the spacer frame 19, which is the leading limb relative to the direction of conveying movement, is properly aligned relative to the clamp means disposed on the vertical limb 14" at the exit end of the frame 8 (see FIG. 8). In this connection, it is desirable for the speed of conveying movement to be reduced by a switch 7 which is operated in a contactless manner, at the end of the conveying movement. The end position of the pane of glass 5, at the exit end of the arrangement, may be defined by an abutment 6 which is fixed with respect to the frame and/or by a light barrier means which detects the vertical edge of the pane of glass 5, which is the front or leading edge relative to the direction of conveying movement.

As soon as the pane of glass 5 has reached its end position, the clamp means 17' at the limb 14" at the exit end are actuated so that the front or leading vertical limb of the spacer frame is precisely aligned. Advancing the pressure pins 30 which are disposed on the limb 14" now also causes the fourth limb of the spacer frame 19 to be pressed against the pane of glass 5, in a precisely aligned position.

The conveyor rollers 4 are now set in operation again and the pane of glass 5 with the spacer frame 19 fitted thereto is moved away from the apparatus and conveyed for example to an assembly station for insulating glass assemblies.

The frame 8 does not need to be moved away from the support wall 1 again, during the step of intermediate conveyance of the pane of glass 5 with the spacer frame 19 pressed thereagainst on three sides; in this connection, it has been found desirable for in particular the clamp strut members 32 disposed on the lower horizontal limb 15 of the frame 8 to be retracted and/or for simply the lower horizontal limb 15 of the frame 8 to be displaced slightly downwardly.

Substantial advantages of the invention are inter alia that the direction of conveying movement of the pane of glass 5 is always the same but nonetheless all four limbs of the spacer frame 19 can be pressed into place in a condition of precise alignment. A further advantage of this embodiment of the apparatus acoording to the invention is that two frames can be simultaneously processed (pressed into position).

Another advantage of this apparatus is that the spacer frames are held by the retractible support pins 16 before being fitted to the frame 8 of the apparatus so that, during the period of time in which a spacer frame 19 is being inserted into the apparatus, a pane of glass coming for example from a washing station is simply conveyed through the apparatus, and the frame is first fitted to the next following pane of glass.

In the embodiment of the clamp means 17' shown in cross-section in FIG. 10, the lower horizontal limb 15 of the frame 8 can be moved up and down and carries the clamp strut or post members 32 rigidly connected thereto. Similarly as in the embodiment shown in FIG. 9, the clamp jaws 33 are coupled to pressure fluid cylinders 35 so that they can be pivoted into the clamping position of being disposed opposite to the clamp jaws 33. In this connection, the limbs 33' of the clamp jaws 33 are guided slidably in the pivot mountings 36 so that they can be drawn towards the clamp jaws 33 under the action of the pressure fluid cylinders 35 for clamping a spacer frame 19, so that they finally assume the clamping position shown in broken lines in FIG. 10. So that the clamp jaws 33 are properly aligned relative to the clamp strut members 32 after they have been pivoted into position thereover, guide abutments 32' are provided on the clamp jaws 32, being associated with the limbs 33' of the clamp jaws 33 and comprising for example resilient material.

As shown in diagrammatic form in FIG. 7, the frame 8, like the conveyor means comprising the conveyor rollers 4, may be subdivided into two halves, about a vertical plane A which is perpendicular to the plane of conveying movement. The two halves of the frame 8, like the two halves of the conveyor means, are movable independently of each other so as to provide the possibility, which has already been indicated above, of simultaneously dealing with two spacer frames. Only when spacer frames are to be fitted to panes of glass which are larger than half the length of the apparatus are the two halves of the frame 8 operated synchronously.

If, in the embodiment shown in FIGS. 1 to 5, the limb of the spacer frame 19 which is at the trailing end relative to the direction of conveying movement is to be pressed into place, clamp means and pressure pins may be provided on the perpendicular limb (not shown in FIG. 2) at the entry end of the frame 2. After the spacer frame 19 has been fitted to the pane of glass 5, the latter is conveyed back until the lower limb of the frame, relative to the direction of conveying movement, is aligned relative to the clamp means 17 provided on the vertical limb at the entry end, whereupon said clamp means align the limb of the spacer frame and press it against the pane of glass 5.

In accordance with an embodiment (not shown) of the apparatus according to the invention, the fourth limb of the spacer frame 19 may be pressed against the pane of glass 5 simultaneously with the other limbs. In this embodiment which is not shown in the drawings, there is a substantially perpendicularly extending beam member which is guided on the apparatus for reciprocal movement in the direction of conveying motion. By suitable control means, the beam member is aligned relative to the edge of the pane of glass, which is the rearward or trailing edge as viewed in the direction of conveying movement. Clamps provided on the perpendicular beam member, simultaneously with the clamp means 17, engage the rearward limb of the spacer frame, which is associated therewith, and move for fitting the spacer frame synchronously with the frame 8 towards the pane of glass 5. For that purpose, the clamp means provided on the perpendicular beam member can be advanced towards the support wall relative to the beam synchronously with the frame 8.

The apparatus according to the invention can also be used in the manufacture of multiple-glazed insulating glass. In that case, instead of the pane of glass, a pack of panes comprising two or more panes of glass and the corresponding number of spacer frames is moved into the apparatus along the support wall and a spacer frame is fitted to the front or foremost pane of glass.

I claim:

1. Apparatus for fitting spacer frames onto panes of glass with adhesive or sealant therebetween, in the course of manufacture of insulting glass panes, comprising a substantially upright support wall, conveyor means for conveying panes of glass into the apparatus, a frame-like mounting support disposed in front of the support-wall, means for moving the mounting support toward and away from the support wall, the mounting support having an upper horizontal limb which is displaceable upwardly and downwardly, a lower horizontal limb and a vertical limb disposed at an exit end of the apparatus, the frame-like mounting support having clamp means thereon, retractable pins (16) for contacting the spacer frames (19), said pins being disposed on said vertical limb (14, 14") and on said horizontal limbs (12, 15) of the frame-like support (8) in the area between the support wall (1) and clamp means (17, 17') also on said vertical and horizontal limbs, said clamp means (17, 17') comprising clamp abutments (22,32) fixedly mounted on the limbs (12, 14, 14", 15) of the frame-like mounting support (8) and clamp members (23,33) which are pivotable to a position over the clamp abutments (22, 32) and movable toward the latter into a position to hold a spacer frame (19) against said abutments.

2. Apparatus according to claim 1, and further clamp means (17, 17') on a further limb of the frame-like mounting support disposed at an entry end of the apparatus and which is parallel to the support wall, and means for reciprocating said further limb in the direction of conveying movement.

3. Apparatus according to claim 1, in which the half of the conveyor means (4) for the panes of glass (5), which is adjacent to the exit-end vertical limb (14") of the frame-like support mounting (8), is actuable independently of the half of the conveyor means (4) which is arranged at the entry end of the apparatus.

4. Apparatus according to claim 1, in which the frame-like support mounting (8) is divided into two halves, about a vertical plane (A) which is perpendicular to the plane of conveying movement, said two halves being movable toward and away from the support wall (1) independently of each other.

5. Apparatus according to claim 1, in which the clamp members (33) are pivotal into their operative position about axes which are parallel to the limbs of the frame-like support mounting (8).

6. Apparatus according to claim 1, in which the clamp members (33) are guided slidably in pivot mountings (36) and can be drawn into the operative position by actuating means.

7. Apparatus according to claim 1, in which the lower horizontal limb (15) of the frame-like support mounting (8) can be lowered slightly during conveying movement of a pane of glass (5) with a spacer frame (19) fitted thereto.

8. Apparatus according to claim 1, in which each clamp plate (23) is arranged eccentrically with respect to a shaft (25) which carries it and which extends perpendicular to the associated limb (12, 14, 15) of the frame-like support mounting (8) and is pivotable and retractable toward the clamp abutment (22) into its operative position.

9. Apparatus according to claim 8, in which, associated with each shaft (25) of the clamp plates (23), is a link member (26) which is displaceable on the shaft (25) in the longitudinal direction thereof and is non-rotatably coupled to the shaft (25), the free end of the link member being pivotally connected to an actuating rod (27).

10. Apparatus according to claim 9, in which the link member (26) has a bore and is fitted by means of said bore over the actuating shaft (25), the link member (26) in the region of the bore having a projection which slidably engages in a longitudinal groove in the actuating shaft (25).

11. Apparatus according to claim 1, in which the front surface of the pins (16), which faces the spacer frame (19), is of a curved configuration.

12. Apparatus according to claim 1, in which the front surface of the support pins (16), which faces the spacer frame (19), extends at an inclined angle with respect to the axis of movement of the pins (16).

13. Apparatus according to claim 1, in which the pins (16), by means of crankshafts (20), are movable with a combined pivoting and longitudinally shifting movement.

14. Apparatus according to claim 1, in which said clamp abutments (32) have abutments (32′) thereon of resilient material adapted to engage limbs (33′) of said clamp members (33).

* * * * *